US006386729B1

United States Patent
Bober

(10) Patent No.: US 6,386,729 B1
(45) Date of Patent: May 14, 2002

(54) LANDSCAPE LIGHTING APPARATUS

(76) Inventor: Michael L. Bober, 2309 W. St. Moritz La., Phoenix, AZ (US) 85023

( * ) Notice: Subject to any disclaimer, the term of this patent is extended or adjusted under 35 U.S.C. 154(b) by 0 days.

(21) Appl. No.: 09/608,252

(22) Filed: Jun. 30, 2000

(51) Int. Cl.[7] .............................................. F21V 21/00
(52) U.S. Cl. ..................... 362/153.1; 362/431; 362/223
(58) Field of Search .............................. 362/153.1, 431, 362/216, 223

(56) References Cited

U.S. PATENT DOCUMENTS

| | | | | | |
|---|---|---|---|---|---|
| 4,438,484 A | * | 3/1984 | Winden | ...................... | 362/267 |
| 5,249,112 A | * | 9/1993 | Bray | ........................... | 362/306 |
| 5,414,607 A | * | 5/1995 | Harris et al. | ................. | 362/362 |
| 5,463,535 A | * | 10/1995 | Vest | ............................ | 362/102 |
| 6,106,134 A | * | 8/2000 | Bomas | ..................... | 362/153.1 |

* cited by examiner

Primary Examiner—Sandra O'Shea
Assistant Examiner—Ronald E. DelGizzi
(74) Attorney, Agent, or Firm—H. Gordon Shields

(57) ABSTRACT

The apparatus disclosed and claimed herein comprises an outdoor lighting fixture having a post extending down into the ground, with a short length of the post extending up above the ground. A lighting fixture, which receives a lamp, is disposed on the upper rim of the ground post. An upper post or lens diffuser is in turn disposed on the fixture, and an outer post housing is disposed over or about the ground post, the fixture, and the upper post or lens diffuser. A lens is appropriately secured to the upper post and lens diffuser and to the outer post housing. If desired, the ground post may be disposed on the surface of the ground or on a hard surface, such as a deck, or the like. Moreover, a weed guard and stabilizer cylindrical element may be disposed about the housing and on the ground to help prevent inadvertent damage from lawn care equipment, inadvertent bumping, and the like. The fixture, of course, may use a compact fluorescent lamp, an incandescent lamp, or any other desired light emitting element. Different types of lens diffuser configurations may also be included for the appropriate direction of light from the lamp element.

21 Claims, 3 Drawing Sheets

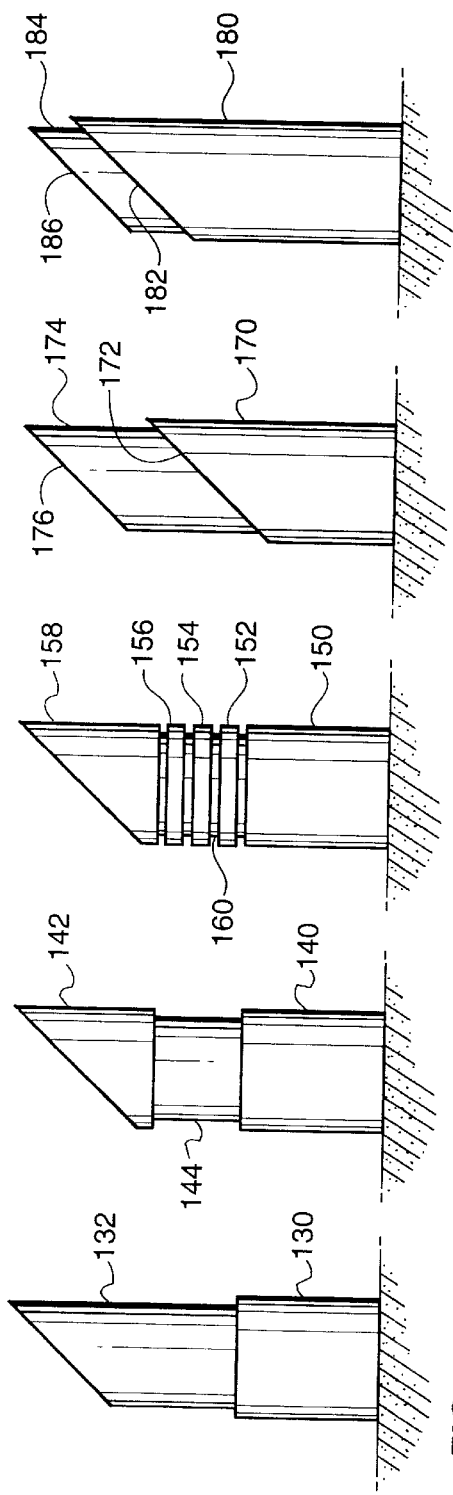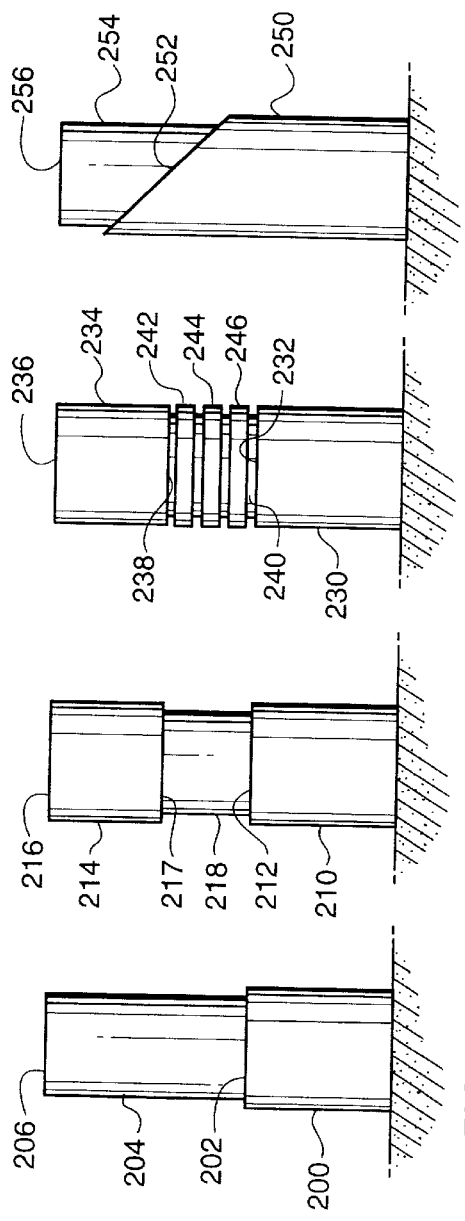

LANDSCAPE LIGHTING APPARATUS

BACKGROUND OF THE INVENTION

1. Field of the Invention

This invention relates to landscape light apparatus and, more particularly, to a light post which may extend partially into the ground, an external post, and internal lamp within the two posts and a lens at the top of the posts.

2. Description of the Prior Art

Outdoor lighting fixtures have been used for many decades. Typically, prior to the late 1980's, an outdoor lighting fixture typically comprised a lighting fixture secured to a metal box which was in turn secured to a conduit extending upwardly from the ground. There were different types of lighting fixtures, two of which were most typically used were the so called pagoda type and the bullet type. The terms were descriptive of the general configuration of the light fixtures.

An improvement over the prior art described in the preceding paragraph is illustrated by U.S. Pat. No. 4,858,877 (Carter) which discloses a nonconductive post and cap with a metal bushing on the cap to which a two-wire fixture may be secured. The conductive (metal) bushing includes a ground wire for appropriately grounding the fixture.

With the advent of three-wire fixtures, the metal bushing on the cap of the '877 apparatus was replaced by a unitary plastic bushing to which a three-wire fixture was then connected. The '877 apparatus, and its sequels, required a light fixture to be secured to the post. Most of the post was disposed in the ground, typically with only the cap above ground and perhaps a relatively short length of the post. The posts were (and are) made of nonconductive material, typically PVC, which is impervious to moisture and ultraviolet radiation damage from the sun.

A limitation of the '877 apparatus is that it is only a post, and does require a light fixture to be secured to it. Thus, there is still a potential problem of the light fixture itself being damaged by vandals, inadvertently bumped by yard equipment, etc.

There are numerous unitary light fixtures or bollards in the prior art which both predate and anti-date the apparatus of the '877 patent. Examples of such are shown in U.S. Pat. No. 2,297,916 (Sauer), which discloses a marine flagpole light and socket. U.S. Pat. No. 3,242,252 (Bergenstein) discloses an outdoor lighting fixture which includes a transformer within a post type housing and a lamp fixture secured to the upper portion of the post.

U.S. Pat. No. 3,671,738 (Beachley) discloses an outdoor light fixture with a double hinged piece for securing a post to the base.

U.S. Pat. No. 3,974,372 (Chochran) discloses a lighting standard having an ornamental exterior and a central pole within the ornamental outer element or shell.

U.S. Pat. No. 4,293,899 (Sanner) discloses an outdoor electrical luminare structure.

U.S. Pat. No. 4,438,484 (Winden) discloses another type of outdoor lighting bollard, a primary feature of which is its vandal resistant structure.

U.S. Pat. No. 4,617,768 (Gebelius) discloses a support member for a lighting fixture which is secured to a base by a locking member. Two types of locking members are illustrated.

U.S. Pat. No. 4,763,233 (Poyer) discloses an outdoor marine lighting fixture, the structure of which is made of nonconductive material(PVC plastic), and within which is disposed a fluorescent lamp.

U.S. Pat. Nos. 4,999,749 and 5,075,833 (Dormand) disclose two embodiments of vandal resistant bollard lights. The '749 apparatus uses concentric tubular members while the '833 apparatus uses only a single steel tubular element.

U.S. Pat. No. 5,105,347 (Ruud et al) discloses a bollard luminare with specific configurations of reflectors.

U.S. Pat. No. 5,156,454 (White) discloses an outdoor lighting fixture disposed in the ground with only a lens cap extending above the ground level. The structure is primarily made of polymer substances, such as PVC and ABS. A lamp is secured with the structure, which includes a pair of cylindrical elements.

The apparatus of the present invention improves over the designs suggested by the above discussed patents by providing tamper-proof lighting fixture with a lens configuration for directing light in a desired direction. The apparatus is primarily made of impervious material, such as PVC, with preferably a polycarbonate lens for directing the light as desired.

SUMMARY OF THE INVENTION

The invention described and claimed herein comprises outdoor lighting apparatus which includes a ground post which may either be disposed on the ground or a portion in the ground and a portion above the ground, a lighting fixtures disposed on the ground post, a lens diffuser disposed on the lighting fixture, with a lens secured to the upper portion of the lens diffuser, and an outer post housing disposed about the ground post, the fixture, and the upper post lens diffuser. Different embodiments are illustrated. The ground post and the outer post housing are preferably made of PVC material which is impervious to moisture and ultraviolet light, and, depending on the thickness, is very resistant to damage. The PVC material is also nonconductive.

Among the objects of the present invention are the following:

To provide new and useful outdoor lighting apparatus;

To provide new and useful outdoor lighting apparatus including post elements and a lamp within the post elements;

To provide new and useful outdoor lighting apparatus including a ground post, a lighting fixture disposed on the ground post, an upper post or lens diffuser disposed on the fixture, and an outer post housing disposed over the ground post, the fixture and the lens diffuser;

To provide new and useful lighting apparatus including a lighting fixture and a lens for diffusing light provided by a lamp in the fixture in a desired direction;

To provide new and useful outdoor lighting apparatus having a weed guard and stabilizer disposed about a ground post; and To provide new and useful outdoor lighting apparatus including a flush mount post for mounting on a surface.

BRIEF DESCRIPTION OF THE DRAWING

FIGS. 5A, 5B, 5C, 5D and 5E are side views of alternate embodiments of the apparatus of the present invention.

FIGS. 6A, 6B, 6C, and 6D are side views of other alternate embodiments of the present apparatus.

DESCRIPTION OF THE PREFERRED EMBODIMENT

Figures 1, 1A:
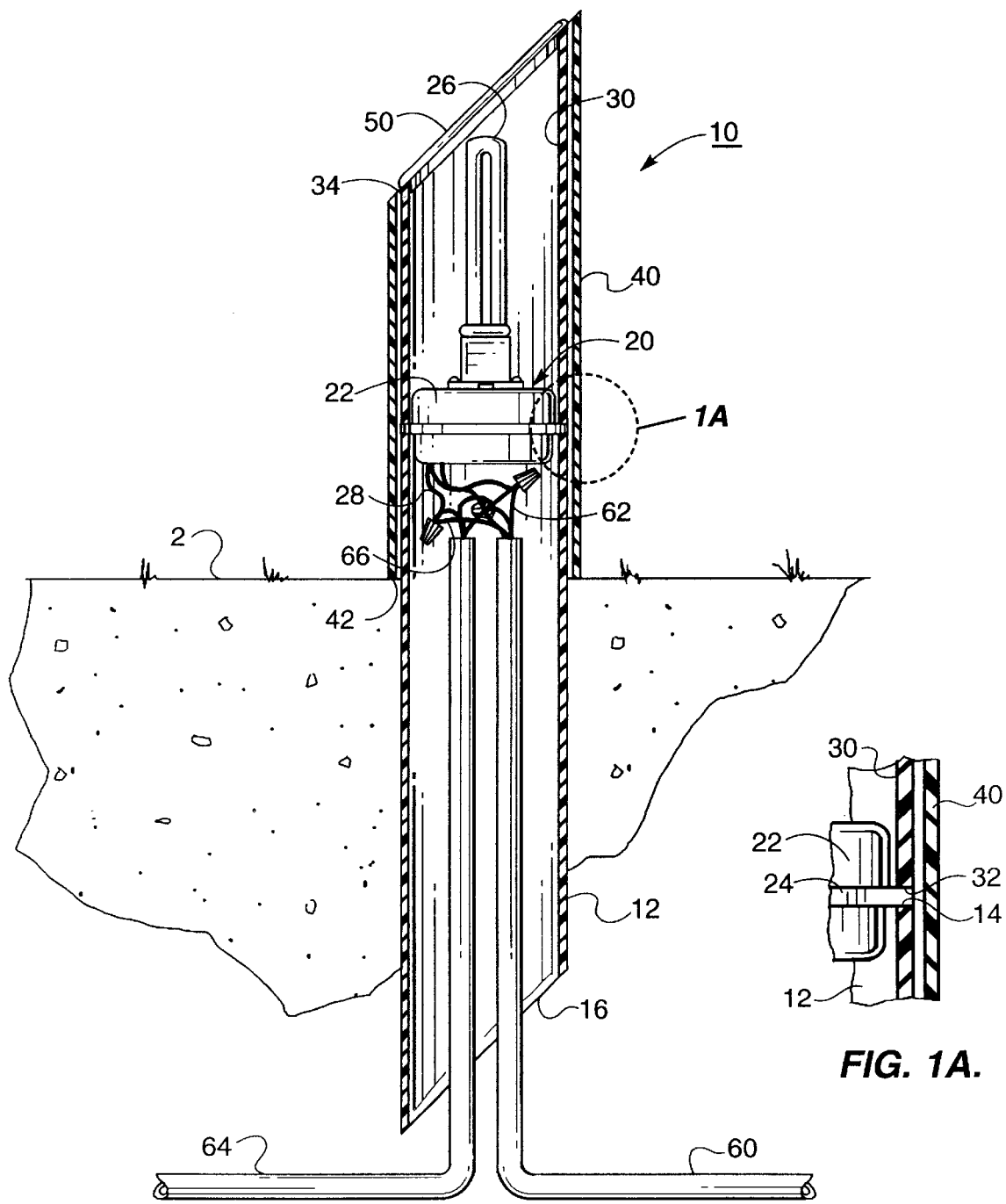
FIG. 1 is a side view in partial section of the apparatus of the present invention.
FIG. 1A is an enlarged view in partial section taken generally from circle 1A of FIG. 1.
Figure 2:
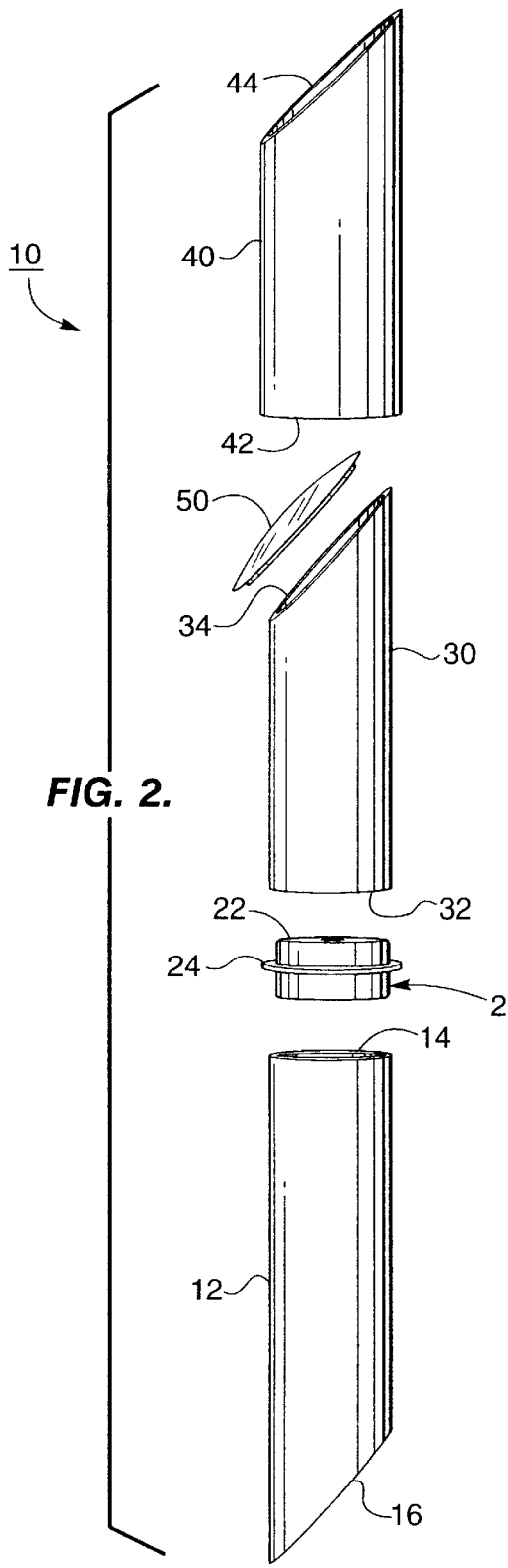
FIG. 2 is an exploded side view of the apparatus of FIG. 1.

FIG. 1 is a side view in partial section of outdoor lighting apparatus 10 of the present invention. FIG. 1A is an enlarged view in partial section taken generally from circle 1A of FIG. 1, and FIG. 2 is an exploded view of the apparatus 10 of FIG. 1. For the following discussion, reference will be made to FIGS. 1, 1A, and 2.

In FIG. 1, the outdoor lighting apparatus 10 is shown disposed partially in the ground and partially disposed on and above ground level 2. The outdoor lighting apparatus 10 includes a ground post 12, a fixture 20, an upper post or lens diffuser 30, and a cylindrical outer post or housing 40. The ground post 12 is preferably of circular configuration and made of nonconductive material, such as PVC. PVC has advantages in that it is not only nonconductive, but is also virtually impervious to deterioration by weather, sun, etc.

The ground post 12 includes a top rim 14 which is disposed a relatively short distance above the surface 2 of the soil or ground 4. The post 12 also includes a bottom rim 16. As shown in FIGS. 1 and 2, the bottom rim 16 comprises a slant cut. However, this slant cut is an optional feature and the bottom rim may be generally perpendicular to the longitudinal axis of the ground post, if desired.

The top rim 14 is preferably generally perpendicular to the longitudinal axis of the ground post 12. The fixture 20 is disposed on the top rim 14. The fixture 20 includes a base 22 with a radially outwardly extending flange 24. The flange 24 extends radially outwardly from the base and is disposed on the rim 14. The outer diameter of the flange 24 is preferably about the same as the outer diameter of the post 12 and the diffuser 30.

Extending upwardly from the base 22 is a lamp 26. The lamp 26 is illustrated as a flourescent fixture, and is well known and understood in the art. A fluorescent fixture has advantages, such as low power consumption for the amount of light output. However, an incandescent bulb, or any other type of lamp may also be used.

Extending from the base 22 are electrical conductors 28.

Extending upwardly from the base and disposed on the flange 24, is the upper post or lens diffuser 30. The upper post or lens diffuser 30 includes a lower rim 32 which is disposed on the flange 24. The upper post or lens diffuser 30 may include a slanted upper rim 34, as illustrated. Secured to the slanted upper rim 34 is a lens cover 50.

If the diffuser 30 is located entirely within the outer housing 40, the diffuser need only be reflective is, however, the diffuser 30 will be seen through the outer housing 40, as illustrated and discussed below for FIGS. 5A, 5B, 5C, 5D, and 5E, and FIGS. 6A, 6B, 6C, and 6D, then the diffuser is preferably translucent.

Disposed about the post or lens diffuser 30 is an outer post or housing 40. The outer post or housing 40 includes a bottom rim 42 which is disposed on the surface or ground level 2. The housing 40 also includes a slanted upper rim 44 which is aligned with the slanted upper rim 34 of the upper post or lens diffuser 30. The outer post or housing 40 may be appropriately secured to the ground post 12 by appropriate fasteners, such as screws (not shown). The outer post 40 may also be appropriately secured to the upper post or lens diffuser by similar, appropriate, fastening elements (not shown). The lens and cover 50 may also be appropriately secured to the upper post or lens diffuser 30 and to the outer post housing 40 by appropriate fastening elements or means.

The outer post or housing 40 is also preferably made out of a nonconductive material, such as PVC, for the same reasons as discussed above for the ground post 12. The upper post or lens diffuser 30 and the lens cover 50 are preferably made of polycarbonate, or the like, to provide for the desired properties or qualities with respect to the lamp 26 and also for strength purposes.

The angles of the slant cuts on the upper post or lens diffuser 30 in the outer post or housing 40 may be as desired with respect to the direction of the light propagation. The configuration of the lens 50 is also in accordance with the desired direction of the light propagation. Thus, if desired, the slant cut may be essentially zero, or substantially perpendicular to the longitudinal axis of the respective posts, if it is desired to direct the light substantially upwardly, and perhaps outwardly. In such case, the lens 50 may have a concave outer configuration to diffuse the light both upwardly and outwardly.

A pair of conduits 60 and 64 are shown in FIG. 1 in the ground 2 and extending upwardly into the bore of the post 12. Electrical supply conductors 62 and 66 extend from the conduits to connect with fixture electrical conductors 28.

Figure 3:
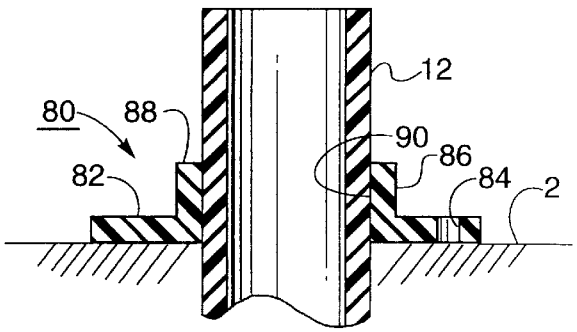
FIG. 3 is a view in partial section of apparatus usable with the apparatus of the present invention.

FIG. 3 is a view in partial section of an optional weed guard or stabilizer 80 illustrated as disposed about the ground post 12. The surface of the ground 2 is indicated in FIG. 3.

The weed guard or stabilizer 80 includes a base 82. The base 82 may include apertures, such as an aperture 84, for receiving a peg or anchor for securing the weed guard and stabilizer 80 to the ground. In the alternative, the base may be appropriately secured directly to the post 12.

A boss 86 extends upwardly from the base 82. The boss 86 includes a top rim 88. A bore 90 extends through both the base 82 and the boss 86. The ground post 12 extends through the bore 90. If the apparatus 80 is secured to the post 12, typically a screw will extend through the boss 86 into the post.

In usage, the rim 88 receives the outer post or housing 40 (see FIGS. 1 and 2) rather than having the bottom of the outer post or housing 40 disposed on the surface 2 of the ground 4, as illustrated in FIG. 1.

The purpose of the weed guard or stabilizer 80 is simply to provide extra stability and protection for the apparatus 10. The weed guard and stabilizer 80 thus prevents a lawn mower, etc., from directly bumping or hitting the apparatus 10 and provides an extra degree of protection and stability for the apparatus 10.

Figure 4:
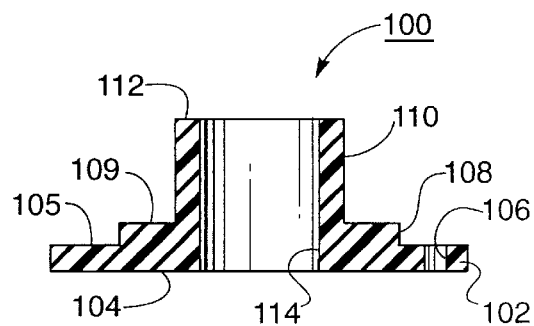
FIG. 4 is a view in partial section of an alternate adapter of the apparatus of the present invention.

An alternate embodiment of the apparatus 10 is illustrated in FIG. 4. FIG. 4 is a view, partially broken away, of a flush mount apparatus 100. The flush mount apparatus 100 includes a base 102 with a generally flat bottom 104 adapted to be disposed on the surface 2 of the ground or on any appropriate relatively flat surface, such as a deck, etc.

Extending through the base is shown a pair of apertures 106. The apertures are shown in dash/dot line. The apertures receive appropriate pegs, or anchor pins, or the like, for securing the apparatus 100 to the surface on which it is disposed.

Extending upwardly from the base 102 is a relatively short boss 108. Extending upwardly from the boss 108 is a post 110. The post 110 terminates in a top rim 112.

Extending through the base 102, the boss 108, and the post 110 is a bore 114. The bore 114 receives the conductors, and perhaps the upper portion of the conduits, such as illustrated in FIG. 1.

The top rim 112 receives the flange 24 of the fixture 20, as shown in FIG. 1. The diffuser is then disposed on the top of the flange 24, as indicated above and as illustrated in FIGS. 1 and 2.

The outer diameter of the boss 108 is substantially the same as the outer diameter of the outer post or housing 40, and accordingly the outer post housing 40 is disposed on a top surface 109 of the boss 108.

For convenience of illustration, a portion of the flush mount apparatus 100 is shown cut away and the cut away portion is cross hatched for plastic material. Thus, the apparatus 100 is, like the apparatus 100, the apparatus 80, etc., preferably made out of PVC, or the like, so as to be resistant to damage by ultraviolet radiation from the sun, and relatively impervious to water damage, as well as being nonconductive.

FIGS. 5A, 5B, 5C, 5D, and 5E comprise alternate embodiments of the outer post or housing 40 of FIGS. 1 and 2. They illustrate different lighting effects which may be achieved by varying the configuration of the outer post 40. These figures may be contrasted with the apparatus 10 of FIGS. 1 and 2. Note that only the above ground portions of the respective lighting apparatuses are shown in FIGS. 5A–5E and also in FIGS. 6A–6D.

In FIG. 5A, an outer post 130 is shown disposed about the lower portion of a diffuser 132. The diffuser 132 is translucent. The diffuser 132 includes a slanted top rim which receives a lens, as discussed above in FIGS. 1 and 2.

It will be noted that all of the embodiments of FIGS. 5A–5E include slanted top rims.

In FIG. 5B, an outer post is shown divided into two portions, a lower portion 140 and an upper portion 142. The two portions 140 and 142 are spaced apart so that a portion of a translucent diffuser 144 is exposed between them.

In FIG. 5C, the outer post is divided into a lower portion 150 and an upper portion 158. Between the top portion 150 and 158 are three spaced apart ring segments 152, 154, and 156. A translucent diffuser 160 allows light to shine outwardly from between the respective outer portions.

In FIG. 5D, an outer post 170 includes a slant cut rim 172, with a diffuser 174 extending upwardly from the outer post 170. The diffuser 174 includes a slat cut rim 176 at which is located a lens.

In FIG. 5E, a longer outer post 180 is shown, again with a slant cut rim 182, as compared with the outer post 170 of FIG. 5D. Thus, a relatively shorter length of translucent diffuser 184 is exposed. The diffuser 184 also includes a slant cut upper rim 186, as does the diffuser 174.

While the outdoor light fixtures of FIGS. 1, 2, and 5A–5E are shown with slant cut upper rims, the light fixtures of FIGS. 6A–6D illustrate flat topped appearing fixtures but with different configurations of outer posts to produce different visual effects.

FIG. 6A shows a relatively short outer post 200 with a rim 202 which is generally perpendicular to the longitudinal axis of the post 200. A diffuser 204 extends upwardly from the post 200 and terminates in a rim 206 which is also perpendicular to the longitudinal axis of the post 200 and the diffuser 204. A lens(not shown) is disposed on the diffuser generally perpendicular to the noted longitudinal axis.

In FIG. 6B, an outer post is divided into two spaced apart portions 210 and 214, with a diffuser 218 showing between the two portions. The rims of the outer post portions are square cut, or generally perpendicular to the longitudinal axes of the cylinder portions 210 and 214 and the diffuser 218. The rims include rim 212 on the lower cylinder 210 and a top rim 216 and a bottom rim 217 on the upper cylinder portion 214. The three rims are thus parallel to each other.

In FIG. 6C, an outer post is divided into two major portions, spaced apart from each other, with three rings disposed between the two major portions. The rings are also spaced apart from each other and from their respective adjacent major portions.

A lower major outer post portion 230 includes a square cut upper rim 232. An upper major outer post 234 includes a square cut upper rim 236 and a square cut lower rim 238. A translucent diffuser 240 is shown between the rims 232 and 238, spaced apart from each other and the rims 232 and 238 are three rings 242, 244, and 246. The rings 242, 244, and 246 are also oriented "squarely" or generally perpendicularly to the longitudinal axes of the respective post portions 230 and 234 and of the diffuser 240.

In FIG. 6D, an outer post 250 includes a slant cut rim 252. The maximum height of the outer post 250 is less than the height of a diffuser 254. The diffuser 254 includes a "square" rim 256. The effect of the two different geometric angles is different from any of the other illustrated embodiments.

While the drawing Figures show circular cylindrical posts and diffusers, it is obvious that other configurations may also be used. Square, rectangular, triangular, and other shapes may provide different lighting effects. Moreover, while PVC has been described as a preferred material for the post elements, other materials may also be used, such as aluminum, other plastics, etc.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What i claim is:

1. Outdoor lighting apparatus comprising in combination:

post means, including a post having a bottom rim and an upper rim, and a bore for receiving electrical supply conductors;

fixture means for receiving a lamp, including a base, fixture electrical conductors for connecting to the electrical supply conductors in the bore of the post means, and an outer flange on the base disposed on the upper rim of the post means;

an upper post disposed on the outer flange of the fixture means, including an upper rim;and a lens disposed on the upper rim of the upper post for diffusing light from the lamp.

2. The apparatus of claim 1 which further includes a housing disposed about the fixture means and the upper post.

3. The apparatus of claim 1 in which the post means includes a first portion disposed above ground and a second portion disposed below ground.

4. The apparatus of claim 3 in which the bottom rim comprises a slant cut.

5. The apparatus of claim 1 in which the post means includes a base adapted to be disposed on a surface.

6. The apparatus of claim 5 which further includes a boss on the base, and the upper post is disposed on the boss.

7. The apparatus of claim 6 in which the post means further includes a post extending upwardly from the boss, and the upper rim is on the post.

8. The apparatus of claim 7 which further includes a housing disposed about the fixture means and disposed on the base about the boss.

9. The apparatus of claim 1 which the post means further includes a weed guard and stabilizer disposed about the post, including a base adapted to be disposed on ground surface.

10. The apparatus of claim 9 which further includes a housing disposed about the upper post and disposed on the boss.

11. The apparatus of claim 1 in which the upper rim of the upper post comprises a slant cut.

12. The apparatus of claim 11 which further includes a housing disposed about the fixture means, the upper post, and at least a portion of the post means.

13. The apparatus of claim 12 in which the housing includes a slanted upper rim aligned with the slant cut of the upper rim of the upper post.

14. The apparatus of claim 1 in which the upper post comprises a diffuser element for diffusing light from the lamp.

15. The apparatus of claim 14 which further includes outer post means bout the diffuser element.

16. The apparatus of claim 15 in which the outer post means includes a pair of spaced apart elements.

17. The apparatus of claim 16 in which the outer post means includes at least a single ring element disposed between the pair of spaced apart elements.

18. The apparatus of claim 15 in which the diffuser has a first height and the outer post means has a second height which is less than the first height.

19. The apparatus of claim 15 in which the outer post means includes a square cut rim.

20. The apparatus of claim 19 in which the diffuser includes a square cut rim.

21. The apparatus of claim 15 in which the outer post means includes a square cut rim, and the diffuser element includes a slant cut rim.

* * * * *